(12) United States Patent
Gruber

(10) Patent No.: US 8,493,404 B2
(45) Date of Patent: Jul. 23, 2013

(54) PIXEL RENDERING ON DISPLAY

(75) Inventor: Andrew E. Gruber, Arlington, MA (US)

(73) Assignee: QUALCOMM Incorporated, San Diego, CA (US)

( * ) Notice: Subject to any disclaimer, the term of this patent is extended or adjusted under 35 U.S.C. 154(b) by 451 days.

(21) Appl. No.: 12/861,865

(22) Filed: Aug. 24, 2010

(65) Prior Publication Data

US 2012/0050313 A1 Mar. 1, 2012

(51) Int. Cl.
| G09G 5/00 | (2006.01) |
| G09G 5/02 | (2006.01) |
| G09G 5/36 | (2006.01) |
| G06F 15/00 | (2006.01) |
| G06F 3/048 | (2006.01) |
| H04N 11/00 | (2006.01) |
| H04N 5/445 | (2011.01) |
| H04N 9/76 | (2006.01) |
| H04N 9/67 | (2006.01) |
| G06K 9/40 | (2006.01) |
| G06K 9/36 | (2006.01) |
| G06K 9/54 | (2006.01) |

(52) U.S. Cl.
USPC ........... 345/606; 345/592; 345/629; 345/501; 345/548; 345/550; 348/552; 348/564; 348/598; 348/659; 382/254; 382/276; 382/307; 715/764; 715/781; 715/783; 715/797

(58) Field of Classification Search
CPC .................................................. G09G 2340/12
USPC ................. 345/418, 581, 589, 592–594, 606, 345/619–624, 629–630, 501, 506, 530, 545, 345/548–550; 348/552–553, 584, 596–598, 348/659, 564; 382/254, 274, 276, 284, 302–305, 307; 715/200, 273, 700, 764–765, 768, 781, 783, 715/790, 797, 803–806
See application file for complete search history.

(56) References Cited

U.S. PATENT DOCUMENTS

| 6,614,444 B1 | 9/2003 | Duluk, Jr. et al. |
| 6,807,620 B1 | 10/2004 | Suzuoki et al. |
| 6,879,328 B2 | 4/2005 | Deering |

(Continued)

FOREIGN PATENT DOCUMENTS

| JP | 2008259605 A | 10/2008 |
| WO | 0068887 A1 | 11/2000 |

OTHER PUBLICATIONS

Wexler et al., "GPU-Accelerated High-Quality Hidden Surface Removal", Proceedings of the ACM Siggraph/Eurographics conference on Graphics hardware, 2005, pp. 1-8.

(Continued)

*Primary Examiner* — Wesner Sajous
(74) *Attorney, Agent, or Firm* — James R. Gambale, Jr.

(57) ABSTRACT

This disclosure describes techniques for rendering pixels on a display. A processing unit may receive pixel values for surface pixels of each surface of a plurality of surface. The processing unit may also receive an order of the plurality of surfaces. Based on at least the location and order of the plurality surfaces, the processing unit may blend pixel values for co-located surface pixels. The processing unit may also accumulate opaqueness values for co-located surface pixels and/or opaqueness values for surfaces with co-located surface pixels.

40 Claims, 4 Drawing Sheets

U.S. PATENT DOCUMENTS

| | | | |
|---|---|---|---|
| 7,042,462 B2 | 5/2006 | Kim et al. | |
| 7,199,801 B2 | 4/2007 | Tsunashima et al. | |
| 7,450,123 B1 | 11/2008 | Kilgard | |
| 7,920,151 B2 | 4/2011 | MacInnis et al. | |
| 8,125,495 B2* | 2/2012 | Darsa et al. | 345/592 |
| 8,196,049 B2* | 6/2012 | Liu et al. | 715/751 |
| 2002/0093516 A1 | 7/2002 | Brunner et al. | |
| 2002/0149626 A1* | 10/2002 | Ozcelik et al. | 345/781 |
| 2002/0171682 A1* | 11/2002 | Frank et al. | 345/790 |
| 2005/0168471 A1* | 8/2005 | Paquette | 345/536 |
| 2005/0270297 A1* | 12/2005 | Munday et al. | 345/502 |
| 2007/0009182 A1* | 1/2007 | Yamauchi | 382/302 |
| 2007/0291189 A1* | 12/2007 | Harville | 349/7 |
| 2008/0001967 A1* | 1/2008 | Rengarajan et al. | 345/629 |
| 2008/0284798 A1* | 11/2008 | Weybrew et al. | 345/630 |
| 2012/0154426 A1* | 6/2012 | Darsa et al. | 345/592 |
| 2012/0212506 A1* | 8/2012 | Liu et al. | 345/629 |

OTHER PUBLICATIONS

International Search Report and Written Opinion—PCT/US2011/049002—ISA/EPO—Dec. 6, 2006.

Vlcek, A. et al., "Front-to-Back Blending with Early Fragment Discarding," Association for Computing Machinery, Inc., May 13-15, 2010, 8 pp.

* cited by examiner

PIXEL RENDERING ON DISPLAY

TECHNICAL FIELD

This disclosure relates to rendering pixels on a display.

BACKGROUND

A device that provides content for visual presentation generally includes a graphics processing unit (GPU). The GPU renders pixels that are representative of the content on a display. The GPU receives one or more pixel values for each pixel on the display. The GPU blends the pixel values for each pixel on the display to render each pixel for presentation.

SUMMARY

In general, this disclosure describes techniques for rendering pixels on a display. A processing unit, such as a graphics processing unit (GPU), may receive a location of a plurality of surfaces that are to be displayed on a display. For a pixel of the display, the processing unit may identify which surfaces include surface pixels that are co-located with the pixel of the display. Each surface pixel may be defined by pixel values that include the color of the pixel and the opaqueness value of the pixel. In some examples, the color of the pixel may also include the intensity of the pixel.

In some examples, instead of or in addition to an opaqueness value for each surface pixel, each surface may be defined by its surface opaqueness value. The processing unit may blend color values of the co-located surface pixels based on an order of the identified surfaces. The processing unit may accumulate the opaqueness values of the co-located surface pixels and/or the surface opaqueness values of identified surfaces that include co-located surface pixels based on the order of the identified surfaces of the plurality of surfaces. In some examples, the processing unit may determine whether to terminate the blending of color values based on the accumulated opaqueness value In one example, aspects of this disclosure are directed to a method comprising receiving, with a processing unit, locations of each one of a plurality of surfaces to be displayed on a display, identifying, with the processing unit, one or more surfaces of the plurality of surfaces that include one or more co-located surface pixels that are co-located with at least one pixel of the display based on at least the location of each one of the surfaces, and blending, with the processing unit, pixels values of the one or more co-located surface pixels, of the identified one or more surfaces, that are co-located with the at least one pixel based on at least an order of the identified one or more surfaces of the plurality of surfaces.

In another example, aspects of this disclosure are directed to an apparatus comprising a graphics processing unit (GPU) configured to receive a location of each one of a plurality of surfaces to be displayed on a display, a shader configured to identify one or more surfaces of the plurality of surfaces that include one or more co-located surface pixels that are co-located with at least one pixel of the display based on the location of each one of the surfaces, and blend pixel values of the one or more co-located surface pixels, of the identified one or more surfaces, that are co-located with the at least one pixel based on at least an order of the identified one or more surfaces of the plurality of surfaces, and a memory configured to store the blended pixel values.

In another example, aspects of this disclosure are directed to a computer-readable storage medium comprising instructions that cause one or more processors to receive locations of each one of a plurality of surfaces to be displayed on a display, identify one or more surfaces of the plurality of surfaces that include one or more co-located surface pixels that are co-located with at least one pixel of the display based on at least the location of each one of the surfaces, and blend pixels values of the one or more co-located surface pixels, of the identified one or more surfaces, that are co-located with the at least one pixel based on at least an order of the identified one or more surfaces of the plurality of surfaces.

In another example, aspects of this disclosure are directed to an apparatus comprising means for receiving locations of each one of a plurality of surfaces to be displayed on a display, means for identifying one or more surfaces of the plurality of surfaces that include one or more co-located surface pixels that are co-located with at least one pixel of the display based on at least the location of each one of the surfaces, and means for blending pixels values of the one or more co-located surface pixels, of the identified one or more surfaces, that are co-located with the at least one pixel based on at least an order of the identified one or more surfaces of the plurality of surfaces.

The details of one or more examples are set forth in the accompanying drawings and the description below. Other features, objects, and advantages will be apparent from the description and drawings, and from the claims.

DETAILED DESCRIPTION

Figure 1:
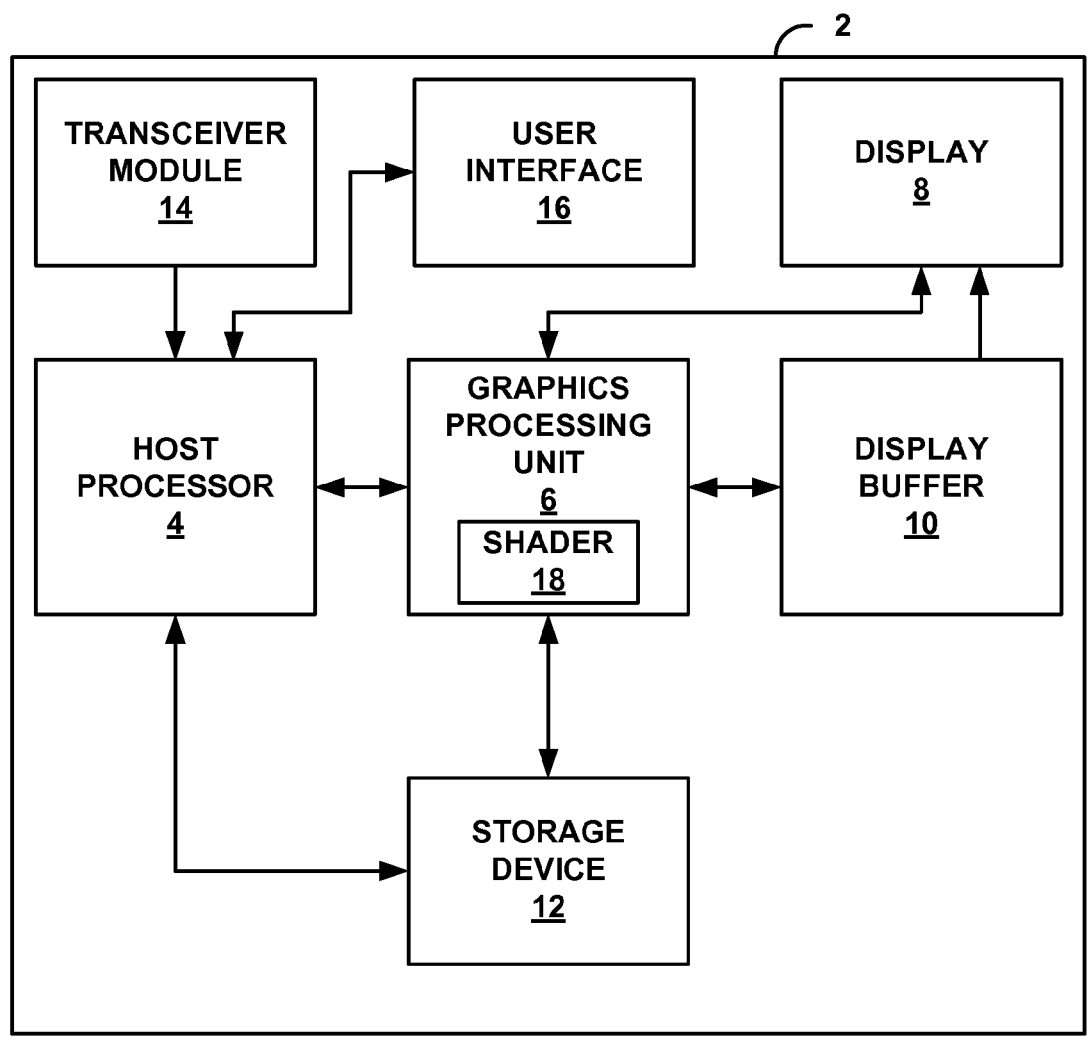
FIG. 1 is a block diagram illustrating a device that may be configured to implement aspects of this disclosure.

One or more applications executed on a device may generate viewable objects to be presented on a display. The viewable objects may be considered as surfaces. Each surface includes surface pixels that are co-located with pixels on the display. Each surface may be identified by its location on the display.

In some instances, a surface may overlap or may be overlapped with another surface, for example, when two surfaces include overlapping locations. In these instances, at least some of the surface pixels of the overlapping surface are co-located with at least some of the surface pixels of the overlapped surface. As used in this disclosure, co-located pixels refer to pixels that are located at a substantially similar location on the display.

In some aspects of this disclosure, for a pixel of the display, a processing unit may identify which surfaces include co-located surface pixels with the pixel of the display. The processing unit may blend the pixel values for the co-located surface pixels based on at least an order of the identified surfaces. The pixel values may indicate a color and an opaqueness value of the pixel. The indication of the color may also indicate an intensity of the pixel. The processing unit may also accumulate opaqueness values of the co-located surface pixels and/or surface opaqueness values of the identified surfaces that include co-located surface pixels based on at least the order of the identified surfaces. In some examples, the processing unit may terminate the accumulation and blending after the accumulated opaqueness value is greater than or substantially equal to an opaqueness value threshold.

In these cases, co-located surface pixels in subsequent identified surfaces may be occluded and not viewable when the accumulated opaqueness value is greater than or substantially equal to the opaqueness value threshold. Because the co-located surface pixels in subsequent identified surfaces may be non-viewable, those surface pixels may not need to be processed, allowing the processing unit to terminate the blending and accumulation. Upon termination of the accumulation and blending, the processing unit may render the pixel on the display or may store the final pixel value in a display buffer for future presentment.

The order of the identified surfaces may indicate which surface is a front-most surface, a next front-most surface, and so forth until the back-most surface. The identified surfaces may be surfaces that include co-located surface pixels that are co-located with a given pixel of the display. As used in this disclosure, the front-most surface of the identified surfaces refers to a surface that is not overlapped by any other identified surface, and the back-most surface of the identified surfaces refers to a surface that does not overlap any other identified surface. The next front-most surface is a surface that may be between the front-most surface and the back-most surface. For example, the next front-most surface may be partially or fully overlapped by the front-most surface, and may partially or fully overlap the back-most surface. There may be multiple intervening surfaces between the front-most surface and the back-most surface. The back-most surface may be the background of the display.

The order of the identified surfaces may be ordered according to an order identifier. The order identifier may indicate which surface is in front of which other surface, and vice versa. As described in more detail below, in some examples, the order identifier may explicitly indicate the order of the identified surfaces; however, aspects of this disclosure are not so limited.

FIG. 1 is a block diagram illustrating a device 2 that may be configured to implement aspects of this disclosure. Examples of device 2 include, but are not limited to, mobile wireless telephones, personal digital assistants (PDAs), video gaming consoles that include video displays, mobile video conferencing units, laptop computers, desktop computers, television set-top boxes, and the like. Device 2 may include host processor 4, graphics processing unit (GPU) 6, display 8, display buffer 10, storage device 12, transceiver module 14, and user interface 16. Host processor 4 and/or GPU 6 may be examples of a processing unit. Device 2 may include additional modules or units not shown in FIG. 1 for purposes of clarity. For example, device 2 may include a speaker and a microphone, neither of which are shown in FIG. 1, to effectuate telephonic communications in examples where device 2 is a mobile wireless telephone. Furthermore, the various modules and units shown in device 2 may not be necessary in every example of device 2. For example, user interface 16 and display 8 may be external to device 2 in examples where device 2 is a desktop computer.

Host processor 4 may execute one or more applications. Examples of the applications include web browsers, e-mail applications, spreadsheets, video games, or other applications that generate viewable objects for presentment. The one or more applications may be stored within storage device 12. In some instances, host processor 4 may download the one or more applications via transceiver module 14. Host processor 4 may execute the one or more applications based on a selection by a user via user interface 16. In some examples, host processor 4 may execute the one or more applications without user interaction.

Examples of host processor 4 include, but are not limited to, a digital signal processor (DSP), general purpose microprocessor, application specific integrated circuit (ASIC), field programmable logic array (FPGA), or other equivalent integrated or discrete logic circuitry. Storage device 12 may comprise one or more computer-readable storage media. Examples of storage device 12 include, but are not limited to, a random access memory (RAM), a read only memory (ROM), an electrically erasable programmable read-only memory (EEPROM), CD-ROM or other optical disk storage, magnetic disk storage, or other magnetic storage devices, flash memory, or any other medium that can be used to carry or store desired program code in the form of instructions or data structures and that can be accessed by a computer or a processor. In some aspects, storage device 12 may include instructions that cause host processor 4 and/or graphics processing unit 6 to perform the functions ascribed to host processor 4 and graphics processing unit 6 in this disclosure.

Examples of user interface 16 include, but are not limited to, a trackball, a mouse, a keyboard, and other types of input devices. User interface 16 may also be a touch screen and may be incorporated as a part of display 8. Transceiver module 14 may include circuitry to allow wireless or wired communication between device 2 and another device or a network. Transceiver module 14 may include modulators, demodulators, amplifiers and other such circuitry for wired or wireless communication.

Upon execution of the one or more applications, host processor 4 may generate viewable objects in the form of surfaces. The surfaces may be rendered on display 8, as an image, for presentation. In some instances, some of the surface pixels of the surfaces may not be rendered because these surface pixels may be occluded by other co-located surface pixels. The surfaces may be circles, lines, rectangles, triangles, or other types of polygons. Host processor 4 may also identify the location of where the surfaces are located on display 8 based on pixel coordinates of display 8. The location may identify the extents of the surfaces on display 8.

Display 8 may comprise a liquid crystal display (LCD), a cathode ray tube (CRT) display, a plasma display, or another type of display device. Display 8 includes a plurality of pixels arranged horizontally and vertically in a 2 dimensional (2-D) pixel array. Each pixel of display 8 may be identifiable by its 2-D coordinate, e.g., (x, y) in Cartesian coordinates. For example, the pixel located at the top-left corner of display 8 may be identified as the pixel located at (0, 0). The pixel immediately to the right of the pixel located at (0, 0) may be identified as the pixel located at (1, 0). The pixel immediately below the pixel located at (0, 0) may be identified as the pixel located at (0, 1). All the pixels of display 8 may be similarly identified.

The Cartesian coordinates described above are described for illustration purposes only. The pixels of display 8 may be identifiable by different types of coordinate systems, e.g., polar coordinates, bipolar coordinates, parabolic coordinates, and the like. Furthermore, the example locations of the pixels are also described for illustration purposes only. In some examples, the pixel located at (0, 0) may be at the bottom-left, top-right, bottom-right, or any other pixel location of display 8.

The location of the surfaces generated by host processor 4 may be defined based on at least the coordinates of the surfaces. In examples where the surfaces are circles, the location of the surfaces may be based on at least the center coordinate and the radius of the circle. The extent of the surface, e.g., the perimeter of the surface, can then be calculated based on the center coordinate and the radius of the circle.

In general, for polygons, the location of the surfaces may be defined based on at least one or more of the vertex coordinates of the vertices of the surfaces. The vertex coordinates of the vertices of the surfaces may identify the extents of the surfaces. In examples where the surfaces are rectangles, the location of the surfaces may be based on the vertex coordinates of the four vertices of the rectangles. In some instances, where the surfaces are rectangles, at least two vertex coordinates may be sufficient to identify the location and extents of the surfaces. The remaining vertex coordinates can be calculated from the two vertex coordinates. For example, the vertex coordinates may be the $(x_{min}, y_{min})$ coordinate that identifies the top-left vertex of the rectangle, and the $(x_{max}, y_{max})$ coordinate that identifies the bottom-right vertex of the rectangle. The bottom-left vertex of the rectangle is then $(x_{min}, y_{max})$, and the top-right vertex of the rectangle is then $(x_{max}, y_{min})$.

For purposes of illustration, aspects of this disclosure are described in the context of rectangle surfaces. However, the surfaces should not be considered limited to rectangle surfaces, and may take the form of other polygons, circles, or the like.

Each surface generated by the execution of the one or more applications includes one or more surface pixels. Host processor 4 may assign pixel values, such as color values including intensity values and opaqueness values, to each one of the surface pixels for each one of the surfaces. The pixel values of each surface pixel indicate the color, brightness, and opaqueness of the surfaces pixels. Host processor 4 may also assign an opaqueness value for the entire surface for each one of one or more surfaces.

The surface pixels represent pixels of the display and are considered to be co-located with pixels on display 8. For example, a surface pixel located at (1, 1) of a first surface is co-located with the pixel located at (1, 1) of display 8 and represents the pixel located at (1, 1) of display 8. A surface pixel located at (1, 1) of a second surface is co-located with the surface pixel located at (1, 1) of the first surface and the pixel located at (1, 1) of display 8, and also represents the pixel located at (1, 1) of display 8.

The color values of each surface pixel may be based on a red value, a green value, and a blue value (RGB values). The RGB values may represent a color and intensity of each surface pixel. The intensity may indicate the brightness of the surface pixel. The opaqueness value of each surface pixel may represent the opacity of each surface pixel. The surface opaqueness value of each surface may represent the opacity of the entire surface. The opacity of a surface pixel, or the opacity of a surface, may indicate the opaqueness of the surface pixel or surface. The opaqueness value may be represented as a fraction of complete opacity. For example, a completely opaque surface pixel or completely opaque surface, i.e., 100% opacity, is assigned an opaqueness value of 1. A translucent surface pixel or a translucent surface that is 50% opaque, i.e., 50% opacity, may be assigned an opaqueness value of 0.5, and so forth. A translucent surface pixel or a translucent surface may not fully occlude other pixels or surfaces. Rather, a translucent surface pixel or a translucent surface may partially occlude other pixels or surfaces. The color values and opaqueness values described above are provided for illustration purposes and should not be considered as limiting. Any technique to identify color values and opaqueness values may be utilized in accordance with aspects of this disclosure.

Host processor 4 may also determine an order of the surfaces generated by the execution of the one or more applications. A surface may partially or fully overlap one or more other surfaces, for example, when at least parts of the surfaces are at a substantially similar location. As one example, the vertex coordinates for a first surface are (1, 1), (5, 1), (1, 5), and (5, 5), and the vertex coordinates for a second surface are (2, 3), (2, 7), (10, 3), and (10, 7). In this example, the first surface partially overlaps the second surface, or vice-versa. From the viewpoint of the user, the surface that overlaps another surface may be seen as being in front of the other surface. From the viewpoint of the user, the surface that is overlapped by another surface may be seen as being behind the other surface. The order of the surfaces may indicate which surface is in front or behind of which other surfaces.

To identify the order of the surfaces, host processor 4 may assign an order identifier to each surface. For example, a surface that is in front of all other surfaces may be assigned an order identifier of 1. The surface that is immediately behind the surface with order identifier of 1 may be assigned an order identifier of 2, and so forth. The order identifier example described above is one example of ordering the surfaces and aspects of this disclosure should not be considered limited to the ordering example described above. In some examples, host processor 4 may not explicitly assign an order identifier to each surface. The order of the surfaces may be determined based on the manner in which host processor 4 processed the surfaces, as described in more detail below.

The order of the surfaces may be selected by the user or by host processor 4 without user intervention. For example, the user may desire for a selected surface to be displayed more prominently than other surfaces. The user may desire that no other surface overlap the selected surface, but may allow for the other surfaces to be overlapped by the selected surface. In this example, the selected surface may be considered as being in front of all other surfaces because no other surface overlaps the selected surface. As another example, host processor 4 may select which surface should be displayed more prominently than the other surfaces based on the type of application being executed. In this example, the surface selected by host processor 4 may overlap other surfaces, but may not be overlapped by any other surface. The surface selected by host processor 4 may be considered as being in front of all other surfaces.

In some examples, host processor 4 may transmit the order, location, surface pixel values, and in some examples, the surface opaqueness value, of each surface to storage device 12 for storage. In some examples, host processor 4 may transmit the order, location, surface pixel values, and surface opaqueness value of each surface to graphics processing unit 6 for further processing.

As described above, in some examples, host processor 4 may not assign an order identifier to each surface. In some of these instances, as one example, graphics processing unit 6 may determine the order of the surfaces based on the order in which host processor 4 stored the location of each surface in storage device 12. As another example, graphics processing unit 6 may determine the order of the surfaces based on the location within storage device 12 where host processor 4 stored the location of each surface. For example, host processor 4 may store the back-most surface at address 0 in storage device 12, the next back-most surface at address 1 in storage device 12, and continuing to the front-most surface at address n in storage device 12. In these examples, the order identifier may be considered as an indication of the order in which host processor 4 stored information for each surface in storage device 12. Other techniques to identify the order of each surface may be utilized, and aspects of this disclosure should not be considered limited to the examples provided above.

Graphics processing unit 6 may process the surface pixels for presentment on display 8. Examples of graphics processing unit 6 include, but are not limited to, a DSP, general purpose microprocessor, ASIC, FPGA, or other equivalent integrated or discrete logic circuitry. Although shown as separate in FIG. 1, in some examples, host processor 4 may include graphics processing unit 6.

For at least one pixel of display 8, graphics processing unit (GPU) 6 may identify which surfaces include surface pixels that are co-located with the at least one pixel of display 8. GPU 6 may identify the surfaces based on at least the surface locations stored in storage device 12 or received from host processor 4. In examples where GPU 6 receives the surface locations from host processor 4, GPU 6 may store the received surface locations in its internal memory, e.g., a cache within GPU 6.

As one example, for a pixel located at (5, 5) on display 8, GPU 6 may identify which surfaces include surface pixels that are also located at (5, 5). GPU 6 may identify which surfaces include co-located surface pixels with the pixel located at (5, 5) on display 8 based on at least the locations of the surfaces. The co-located surface pixels may be considered as being co-located with respect to one another and with respect to the location of the pixel of display 8.

GPU 6 may also receive the order of the surfaces from host processor 4 or storage device 12. The order of the surfaces may identify which surface is in front or behind of which other surfaces. In examples where GPU 6 receives the order of the surfaces from host processor 4, GPU 6 may store the order identifiers in its cache.

As described above, in some examples, host processor 4 may not assign an order identifier to each surface. In some of these examples, GPU 6 may determine the order of the surfaces based on the order in which host processor 4 stored information for the surfaces in storage device 12. For example, host processor 4 may transmit to GPU 6 an ordered list of locations in storage device 12 where information for each surface is stored. The first location in the ordered list may correspond to the location within storage device 12 where information for the back-most surface is stored, the second location in the ordered list may correspond to the location within storage device 12 where information for the next back-most surface is stored, and so forth. GPU 6 may identify the order of the surfaces based on the ordered list of locations in storage device 12 where information for each surface is stored.

For purposes of clarity and illustration, aspects of this disclosure are described with respect to an order identifier. However, aspects of this disclosure are applicable to examples where host processor 4 may not assign an order identifier. In these examples, as described above, GPU 6 may determine the order of the surfaces based on the order in which host processor 4 stored information for the surfaces in storage device 12.

GPU 6 may include shader 18, although, in some instances, shader 18 may be external to GPU 6. Shader 18 may be implemented as a hardware unit, firmware unit, or software unit. In examples where shader 18 is implemented as firmware or software, a hardware unit such as GPU 6 may execute shader 18. Also, in some examples where shader 18 is implemented as firmware or software, shader 18 may be uploaded to GPU 6. Shader 18 may be configured to blend pixel values for surface pixels that are co-located with respect to one another and with respect to pixels of display 8. In some examples, shader 18 may blend surface pixel values for the pixels on display 8 in a raster fashion.

The term blend as used in this disclosure represents the possible combination of multiple surface pixels to generate a blended pixel value that is to be rendered on display 8. Accordingly, the term blend or blending as used in this disclosure encompasses situations where surface pixel values are combined. In some instances, when blending two or more co-located surface pixels, and the opaqueness value for the surface pixel that is in front of other co-located surface pixel or pixels indicates a 100% opacity, shader 18 may utilize only the pixel value of the in front surface pixel. In these examples, the in front surface pixel may fully occlude the other co-located surface pixels and only the pixel values of the in front surface pixel may be needed for processing by shader 18.

For example, shader 18 may start at the pixel located at (0, 0) on display 8. Shader 18 may identify which surfaces include co-located surface pixels that are co-located with the pixel located at (0, 0) on display 8 based on the locations of the surfaces. For example, the location of a first surface may indicate that the vertices of the first surface are located from (0, 0), (1, 0), (0, 1), and (1, 1). In this example, the first surface includes a surface pixel, e.g., the surface pixel located at (0, 0), that is co-located with the pixel located at (0, 0) on display 8. Shader 18 may also determine an order of the identified surfaces. Shader 18 may receive the order identifier for each surface, or may receive the order of the identified surfaces determined by GPU 6. In some examples, based on the received order identifiers, shader 18 may determine the order of the identified surfaces. The identified surfaces may be a subset of the surfaces generated by host processor 4. The identified surfaces are surfaces that include the co-located surface pixels. Based on the order of the identified surfaces, shader 18 may identify a front-most surface of the identified surfaces, a back-most surface of the identified surfaces, and the order of any intervening surfaces between the front-most surface of the identified surfaces, and the back-most surface of the identified surfaces.

After determining the order of the surfaces that include co-located surface pixels that are co-located with the pixel located at (0, 0) on display 8, shader 18 may retrieve the pixel values of the co-located surface pixel of the front-most surface of the identified surfaces, and may also retrieve the surface opaqueness value of the front-most surface, in some examples. Shader 18 may retrieve the pixel values and the surface opaqueness value from storage device 12 or the cache of GPU 6.

The cache of GPU 6 or storage device 12 may store an accumulated opaqueness value and blended color value. Shader 18 may update the stored blended color value based on the opaqueness value and color value of the co-located surface pixel. In examples where each surface includes a surface opaqueness value, the opaqueness value of the co-located surface pixel may be equivalent to the surface opaqueness value. To update the stored blended color value, shader 18 may retrieve the current stored blended color value and blend the current stored blended color value with the color value of the co-located surface pixel of the front-most surface. Techniques to bend the color values are described in more detail below.

In some examples, shader 18 may also update the accumulated opaqueness value based on the opaqueness value of the co-located surface pixel. In one example, instead of or in addition to, shader 18 may update the accumulated opaqueness value based on the surface opaqueness value of the front-most surface.

In some non-limiting examples, shader 18 may determine whether the accumulated opaqueness value is substantially equal to or greater than an opaqueness value threshold. In some examples, the opaqueness value threshold may be complete opacity, e.g., 100% opacity, although other opaqueness value thresholds are possible.

The accumulated opaqueness value may initially be 0. The accumulated opaqueness value may be updated by subtracting the current accumulated opaqueness value from 1. The resulting value may be multiplied by the opaqueness value of the current pixel and the opaqueness value of the current surface. The equations to calculate the accumulated opaqueness value may be:

New opaqueness value=$Dest\_alpha+(1-Dest\_alpha)^{*}$
($Src\_alpha^{*}surface[i].surface\_alpha$)
$Dest\_alpha$=New opaqueness value.

In the previous equations, Dest_alpha is the current accumulated opaqueness value, Src_alpha is the opaqueness value of the current surface pixel, and surface[i].surface_alpha is the opaqueness value of the current surface.

As one example, assume the opaqueness value of a first surface pixel of a first surface is 0.4, the opaqueness value of a second surface pixel, co-located with the first surface pixel, of a second surface is 0.6, and the opaqueness value of a third surface pixel, co-located with the first and second surface pixels, of a third surface is 0.8. In this example, assume the opaqueness value of the first, second, and third surface, e.g., surface opaqueness value, is 1. Also, assume that in this example, the opaqueness value threshold is 0.95.

In this example, where the opaqueness value of the first surface pixel is 0.4 and the opaqueness value of the first surface is 1, the updated accumulated opaqueness value after shader 18 processes the first surface pixel is 0.4, i.e., 0+(1−0)*(0.4*1). In some examples, shader 18 may compare the accumulated opaqueness value with the opaqueness value threshold, e.g., compare 0.4 with 0.95. Because the accumulated opaqueness value is less than the threshold, shader 18 may proceed to the second surface pixel on the second surface.

As noted above, the opaqueness value of the second surface pixel is 0.6 and the opaqueness value of the second surface is 1. In this example, the updated accumulated opaqueness value, after shader 18 processes the second surface pixel, is 0.76, i.e., 0.4+(1−0.4)*(0.6*1). Because the accumulated opaqueness value, e.g., 0.76, is less than the opaqueness value threshold, e.g. 0.95, shader 18 may proceed to the third surface pixel on the third surface.

As noted above, the opaqueness value for the third surface pixel is 0.8 and the opaqueness value of the third surface is 1. In this example, the updated accumulated opaqueness value, after shader 18 processes the third surface pixel, is 0.952, i.e., 0.76+(1−0.76)*(0.8*1). In this example, because the accumulated opaqueness value, e.g., 0.952, is greater than the opaqueness value threshold, e.g., 0.95, shader 18 may terminate the accumulation. Any surface pixel that is co-located with the first, second, and third surface pixels, and belonging to a surface that it is subsequent to the third surface may be considered as being occluded and not viewable because the total opacity of the first, second, and third surface is greater than the opaqueness value threshold, in this example.

Shader 18 may then proceed to the next front-most surface of the identified surfaces. The next front-most surface may be identified by is order identifier, as one example. Shader 18 may accumulate the opaqueness value of the co-located surface pixel of the next front-most surface located at (0, 0), and may also accumulate the surface opaqueness value of the next front-most surface, with the accumulated opaqueness value. Shader 18 may also blend the color value of the co-located surface pixel of the next front-most surface with the stored blended color value. Shader 18 may determine whether the accumulated opaqueness value is substantially equal to or greater than the opaqueness threshold value.

Shader 18 may then proceed to the surface that is behind the next front-most surface and perform functions similar to those described above. In some examples, shader 18 may continue with the surfaces until it reaches the back-most surface, and then terminate the blend and accumulation. In some examples, shader 18 may continue with the surfaces until the accumulated opaqueness value is substantially equal to or greater than the opaqueness value threshold. In these examples, when the accumulated opaqueness value is substantially equal to or greater than the opaqueness value threshold, shader 18 may terminate the blend and accumulation.

As described above, in some examples, for a given pixel of display 8, shader 18 may retrieve pixel values for the co-located surface pixel of the front-most identified surface and then perform blending. Shader 18 may then proceed to the next front-most surface, perform blending, and proceed to the surface that is behind the next front-most surface. However, aspects of this disclosure are not so limited. In some examples, rather than starting from the front-most identified surface, shader 18 may start from the back-most identified surface. For a given pixel of display 8, shader 18 may retrieve pixel values for the co-located surface pixel of the back-most identified surface and perform blending. Shader 18 may then proceed to the next back-most identified surface, perform blending, and proceed to the surface that is in front of the next back-most identified surface, and so forth. Shader 18 may terminate the blending after processing the co-located pixel of the front-most identified surface. In examples where shader 18 starts from the back-most surface and proceeds to the front-most surface, shader 18 may not accumulate the opaqueness values of the surface pixels or the surface opaqueness values.

After terminating the blend and accumulation, GPU 6 may render the pixel located at (0, 0) on display 8 based on at least the blended color value. GPU 6 may transmit the rendered pixel value to display 8 for presentment or display buffer 10 for temporary storage. In examples where GPU 6 transmits the rendered pixel value to display 8, display 8 presents the rendered pixel, e.g., the pixel located at (0, 0) on display 8.

Display buffer 10 may be a buffer that is sized the same as display 8. For example, display buffer 10 may include a 2-D storage array for storage of pixel values. Each location within the 2-D storage array may correspond to each pixel on display 8. For example, the (100, 50) location in the 2-D storage array of display buffer 10 corresponds to the pixel located at (100, 50) on display 8. In examples where GPU 6 transmits the rendered pixel value to display buffer 10, display buffer 10 may store the rendered pixel value in its corresponding location in the 2-D storage array. For example, after GPU 6 renders the pixel located at (100, 50) on display 8 and transmits the rendered pixel value to display buffer 10, display buffer 10 stores the rendered pixel value in the (100, 50) location of the 2-D storage array.

Display buffer 10 may store the rendered pixel values until GPU 6 completes the rendering of all the pixels on display 8. Display buffer 10 may then transmit the rendered pixel values to display 8 for presentation and clear all stored values. Display buffer 10 is provided for illustration purposes only, and may not be necessary in every example of device 2.

In the previous example, shader 18 started with the pixel located at (0, 0) on display 8. After termination of the blend and accumulation for surfaces pixels that are co-located with the pixel located at (0, 0) on display 8, shader 18 may then proceed to another pixel on display 8 and perform similar functions. For example, shader 18 may proceed with blending pixel values for the pixel located at (0, 1) on display 8. Shader 18 may blend pixel values for one or more pixels on display 8 utilizing techniques similar to those described above.

As described above, shader 18 may blend pixel values for one or more pixels on display 8 one at a time. For example, as described above, shader 18 blends pixel values for the pixel located at (0, 0) on display 8, then proceeds to blend pixel values for the pixel located at (0, 1), and so forth. In some examples, rather than blending pixel values one at a time, shader 18 may blend pixel values for multiple pixels concurrently. For example, shader 18 may blend pixel values for the pixels located (0, 0), (0, 1), and (0, 2) on display 8 at the same time, and then proceed to the pixels located at (0, 3), (0, 4), and (0, 5) on display 8, and so forth.

Furthermore, as described above, shader 18 may retrieve pixel values of co-located surface pixels one at a time. For example, as described above, shader 18 retrieves the pixel values from the co-located surface pixel from the front-most surface of the identified surfaces, blends the pixel values, then retrieves the pixel values from the co-located surface pixel from the next front-most surface of the identified surfaces, and so forth. In some examples, rather than retrieving pixel values of co-located surface pixels one at a time, shader 18 may retrieve pixel values of at least some of the co-located surface pixels in a batch. A batch of co-located surface pixels may refer a plurality of co-located surface pixels on different surfaces. Retrieval of a batch of co-located surface pixels may include shader 18 retrieving a plurality of co-located surface pixels on different surfaces with one access to the cache of GPU 6 or storage device 12. For example, shader 18 may retrieve the pixel values for the co-located surface pixels of the front-most surface, the next front-most surface, and the surface immediately behind the next front-most surface in a batch, e.g., with one access to the cache of GPU 6 or storage device 12.

In some aspects of this disclosure, GPU 6 may read and write pixel values for the pixels on display 8 only once. Reading of pixel values from memory and writing of pixel values for display is referred to as block transform (BLT) or (BLTing). Repeated BLTing may require extensive processing and bandwidth consumption due to repeated requests for pixel values and the writing of rendered pixel values. This repeated BLTing may occur in some devices where a processing unit starts from the back-most surface and continues toward the front-most surface. Furthermore, the repeated BLTing may also render pixels that are subsequently occluded by overlapping surface pixels.

In non-limiting examples of this disclosure, for pixels on display 8, GPU 6 may only need to read pixel values of co-located surface pixels once, and may only need to write the rendered pixel value once, thereby promoting efficient processing and bandwidth consumption. As described above, shader 18 may update the blended color value for each co-located surface pixel that is co-located with a pixel on display 8, starting from a front-most surface of the identified surfaces and continuing towards the back-most surface of the identified surfaces, as one example. As another example, shader 18 may update the blended color value for each co-located surface pixel that is co-located with a pixel on display 8, starting from a back-most surface of the identified surfaces and continuing towards the front-most surface of the identified surface. The rendered pixel value for the pixel on display 8 is then provided only once, after termination of the accumulation, rather than after every time a co-located surface pixel is blended. Shader 18 may be considered as a shader that performs a single screen-size BLT operation.

Non-limiting aspects of this disclosure may also further promote efficient processing and bandwidth consumption. As described above, in some non-limiting examples, shader 18 may accumulate opaqueness values for each co-located surface pixel and/or opaqueness values of each surface, e.g., surface opaqueness values. Shader 18 may accumulate the opaqueness values starting from the front-most surface of the identified surfaces and continuing toward the back-most surface of the identified surfaces. In some examples, after the accumulated opaqueness value is substantially equal to or greater than an opaqueness value threshold, shader 18 may terminate the blending and accumulation.

In these examples, shader 18 may not retrieve pixel values for other co-located surface pixels that are behind a surface where shader 18 terminated the blending and accumulation. For example, assume that shader 18 terminated the blending and accumulation for a co-located surface pixel after the third surface, which may be the third surface in a front-to-back ordering of the identified surfaces. In this example, shader 18 may not retrieve pixel values for co-located surface pixels of surfaces that are behind the third surface. In this case, such pixels would not be presented (or at least not presented to a sufficient degree), even if rendered, because the opaqueness value is sufficiently high such that the pixels are substantially or completed occluded.

When shader 18 terminates the blending and accumulation, co-located surface pixels, behind the surface where shader 18 terminated blending and accumulation, may be completely occluded and may not be viewable by the user. As described above, shader 18 may terminate the blending and accumulation when the opaqueness value is substantially equal to or greater than an opaqueness value threshold. The opaqueness value threshold may be complete opacity, although other thresholds are possible. Complete opacity may indicate that co-located surface pixels, which are behind the surface pixel where the accumulation indicated complete opacity, are not viewable.

Because co-located surface pixels, which are behind the surface where shader 18 terminated blending and accumulation, will not be viewable by the user, shader 18 may not need to retrieve and process their pixel values. In this manner, shader 18 may retrieve and process pixel values for co-located surface pixels that are viewable, and not retrieve pixel values for co-located surface pixels that are not viewable, thereby further promoting efficient processing and bandwidth consumption.

In some examples, aspects of this disclosure may be implemented without tessellation. Tessellation may require a processing unit to determine portions of a surface that are overlapped by one or more other surfaces. The processing unit than divides, i.e., tessellates, the surfaces into sub-surfaces. The sub-surfaces may be the portions that are overlapped by or that overlap other surfaces. The processing unit then processes these tessellated sub-surfaces. However, tessellation can be a complex and relatively slow process. Tessellation may not be efficient in processing surfaces that include both opaque surface pixels and translucent surface pixels.

Aspects of this disclosure may also be implemented utilizing color only processing techniques without requiring Z (or depth) coordinates for each pixel, as in the case for Z buffer with early Z test techniques. The Z buffer with early Z test technique may require a processor to identify each pixel based on an (x, y, z) coordinate system, rather than just (x, y) and requires additional memory surface to store the z coordinate value for each pixel. The storing and reading of the additional z coordinate may require additional bandwidth. However, by processing each pixel based on its color, (x, y) coordinates, and known surface ordering without additional Z buffer processing, aspects of this disclosure may be useful in rendering pixels in a manner that reduces the number or reads and writes of GPU 6, as well as, efficiently processes surfaces that include a mixture of opaque and translucent surface pixels.

Figure 2:
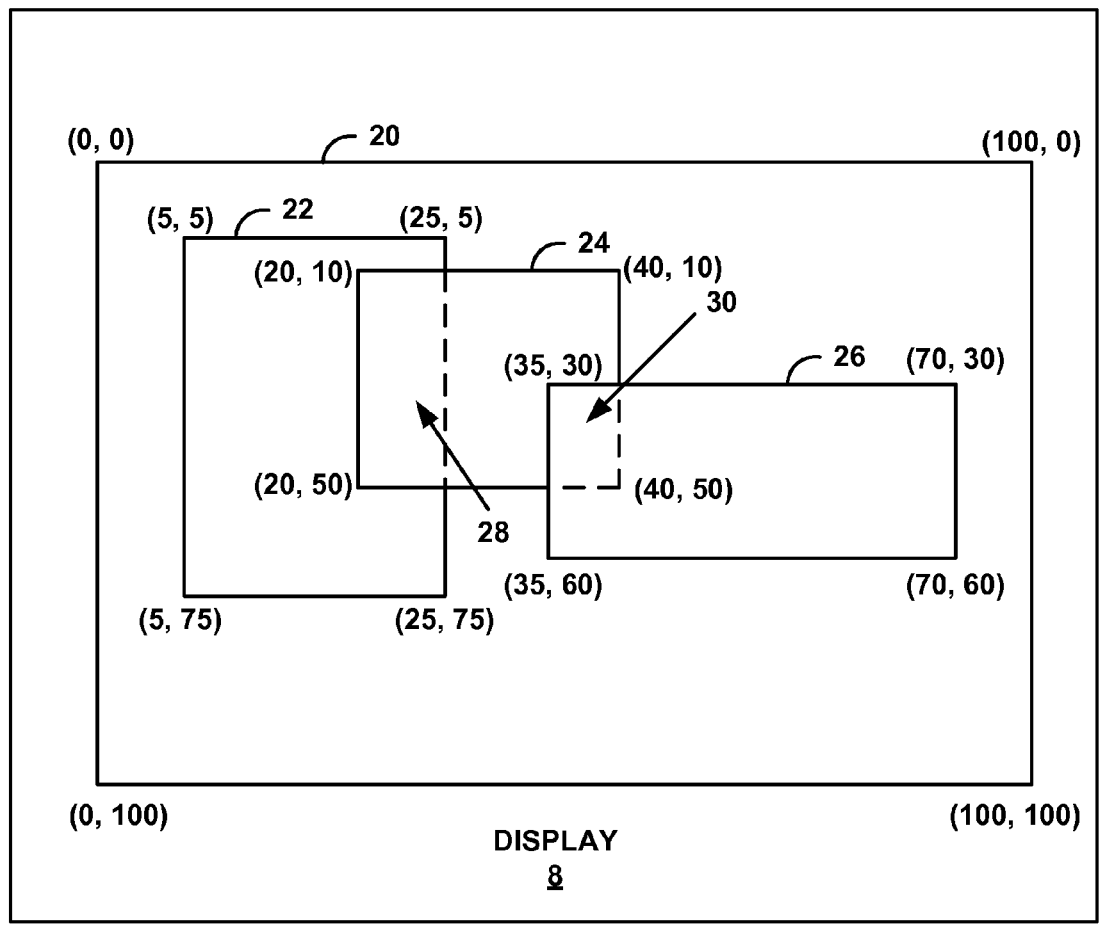
FIG. 2 is an example illustration of a display presenting a plurality of surfaces.

FIG. 2 is an example illustration of display 8 presenting a plurality of surfaces. The example of FIG. 2 is provided for illustration purposes only, and should not be considered as limiting. As shown in FIG. 2, display 8 presents surface 20, surface 22, surface 24, and surface 26. Surface 20 may be the background of display 8. For purposes of illustration, display 8 comprises a 2-D array of 100×100 pixels. Surface 20 includes vertices at: (0, 0), (0, 100), (100, 0), and (100, 100). Surface 22 includes vertices at: (5, 5), (5, 75), (25, 5), and (25, 75). Surface 24 includes vertices at: (20, 10), (20, 50), (40, 10), and (40, 50). Surface 26 includes vertices at: (35, 30), (35, 60), (70, 30), and (70, 60).

As shown in FIG. 2, surface 22 is overlapped by surface 24. Portion 28 of surface 24 overlaps a portion of surface 22. The dashed line of surface 22 indicates the extents of surface 22 that is overlapped by surface 24 and not viewable by the user. Surface 24 is overlapped by surface 26. Portion 30 of surface 26 overlaps a portion of surface 24. The dashed line of surface 24 indicates the extent of surface 24 that is overlapped by surface 26 and not viewable by the user.

In aspects of this disclosure, GPU 6 may receive the location and order of each one of surfaces 20, 22, 24, and 26. The location may be based on the extents of surfaces 20, 22, 24, and 26 defined by their vertices. The order of the surfaces may identify surface 26 as the first surface, surface 24 as the second surface, surface 22 as the third surface, and surface 20 as the fourth surface, which may be the background of display 8.

For a pixel on display 8, GPU 6 may identify which surfaces 20, 22, 24, and 26 include co-located surface pixels that are co-located with the pixel on display 8. GPU 6 may identify the surfaces 20, 22, 24, and 26 based on at least the locations of the surfaces. The locations of surfaces 20, 22, 24, and 26 may be defined by their vertices. For example, a pixel located at (10, 20) on display 8 is co-located with surface pixels from surfaces 22 and 20. As another example, a pixel located at (22, 30) on display 8 is co-located with surface pixels from surfaces 24, 22, and 20. As yet another example, a pixel located at (37, 40) on display 8 is co-located with surface pixels from surfaces 26, 24, and 20.

For the pixel on display 8, shader 18 may blend color values, and in some examples, accumulate opaqueness values of one or more of the co-located surface pixels that are co-located with the pixel on display 8. For one or more co-located surface pixels, shader 18 may blend the pixel values based on at least the color values and opaqueness values of the co-located surface pixels. Example techniques to blend the pixels values are provided in more detail below. Shader 18 may update a stored blended color value after blending each co-located surface pixel. Shader 18 may update a stored accumulated opaqueness value after accumulating opaqueness values of each co-located surface pixel or opaqueness values of each of the surface that includes the co-located surface pixels. For the blending and accumulation, shader 18 may start with the front-most surface of the identified surface and continue toward the back-most surface of the identified surfaces.

As one example, for a pixel on display 8 located at (22, 30), shader 18 may identify surfaces 24, 22, and 20 as surfaces that each include a surface pixel that is co-located with the pixel located at (22, 30) on display 8. Based on the order identifiers, as one example, of surfaces 24, 22, and 20, shader 18 may identify the front-most surface of the identified surfaces, the back-most surface of the identified surfaces, and the order of any intervening surfaces. In this example, shader 18 may identify surface 24 as the front-most surface, surface 22 as the next front-most surface, and surface 20 as the back-most surface.

In examples where shader 18 starts processing from the front-most surface of the identified surfaces, shader 18 may then retrieve the pixel values for the co-located surface pixel of surface 24 because surface 24 is the front-most surface. Shader 18 may blend the pixel values of the co-located surface pixel of surface 24 with the stored blended color value. The stored blended color value may be initialized to zero, and updated after each pixel blend by shader 18. Shader 18 may update the stored blended color value based on the pixel values of the co-located surface pixel of surface 24.

Shader 18 may also accumulate the opaqueness value of the co-located surface of surface 24 and/or the opaqueness value of surface 24, e.g., the surface opaqueness value of surface 24, with the accumulated opaqueness value. The accumulated opaqueness value may be initialized to zero, and updated after each accumulation by shader 18.

In some examples, after each blend, shader 18 may compare the accumulated opaqueness value to an opaqueness value threshold. If the accumulated opaqueness value is less than the opaqueness value threshold, shader 18 may proceed to the next surface, in a front-to-back manner. In this example, shader 18 may proceed to surface 22 and process the co-located surface of surface 22 in a substantially similar manner as described above with respect to the co-located surface pixel of surface 24.

If the accumulated opaqueness value is substantially equal to or greater than the opaqueness value threshold, shader 18 may terminate the blending and accumulation. In this example, shader 18 may not process the co-located surface pixel of surface 22. In this example, the co-located surface pixel of surface 22 may be completely occluded by the co-located surface pixel of surface 24. The completely occluded surface pixel of surface 22 may not be viewable by the user and may not need to be processed.

In examples where shader 18 starts processing from the back-most surface of the identified surfaces, shader 18 may then retrieve the pixel values for the co-located surface pixel of surface 20 because surface 20 is the back-most surface. Shader 18 may blend the color value. Shader 18 may blend the pixel values of the co-located surface pixel of surface 20 with the stored blended color value. Shader 18 may then proceed to the next back-most surface, which is surface 22 in the example illustrated in FIG. 2.

Figure 3:
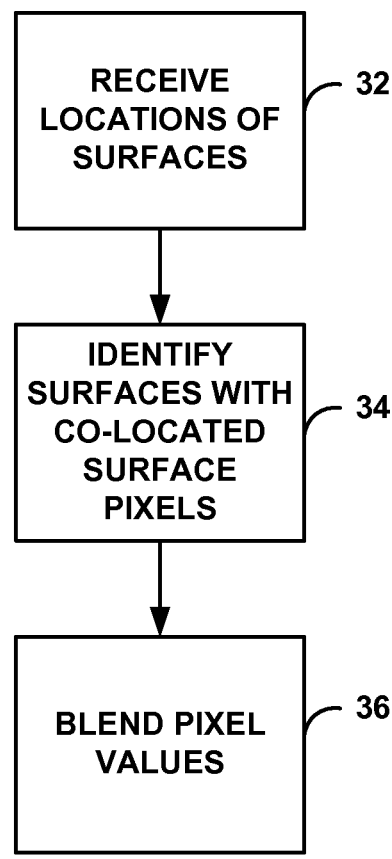
FIG. 3 is a flow chart illustrating an example operation of a graphics processing unit (GPU) in accordance with some aspects of this disclosure.

FIG. 3 is a flow chart illustrating an example operation of GPU 6 in accordance with some aspects of this disclosure. For purposes of illustration, reference is made to FIG. 1. GPU 6 may be a processing unit. For example, the processing unit may be configured to process surface pixels as described above with respect to GPU 6 and shader 18.

GPU 6 may receive locations of each one of a plurality of surface to be displayed on a display (32). In some examples, shader 18, which may be formed within GPU 6, may identify one or more surfaces of the plurality of surfaces that include one or more co-located surface pixels that are co-located with at least one pixel on the display based on at least the location of each one of the surfaces (34). The one or more co-located surface pixels that are co-located with the at least one pixel may be co-located with respect to one another. GPU 6 may then blend pixel values of the one or more co-located surface pixels, of the identified one or more surfaces, that are co-located with the at least one pixel based on at least an order of the identified one or more surfaces of the plurality of surfaces (36).

Figure 4:
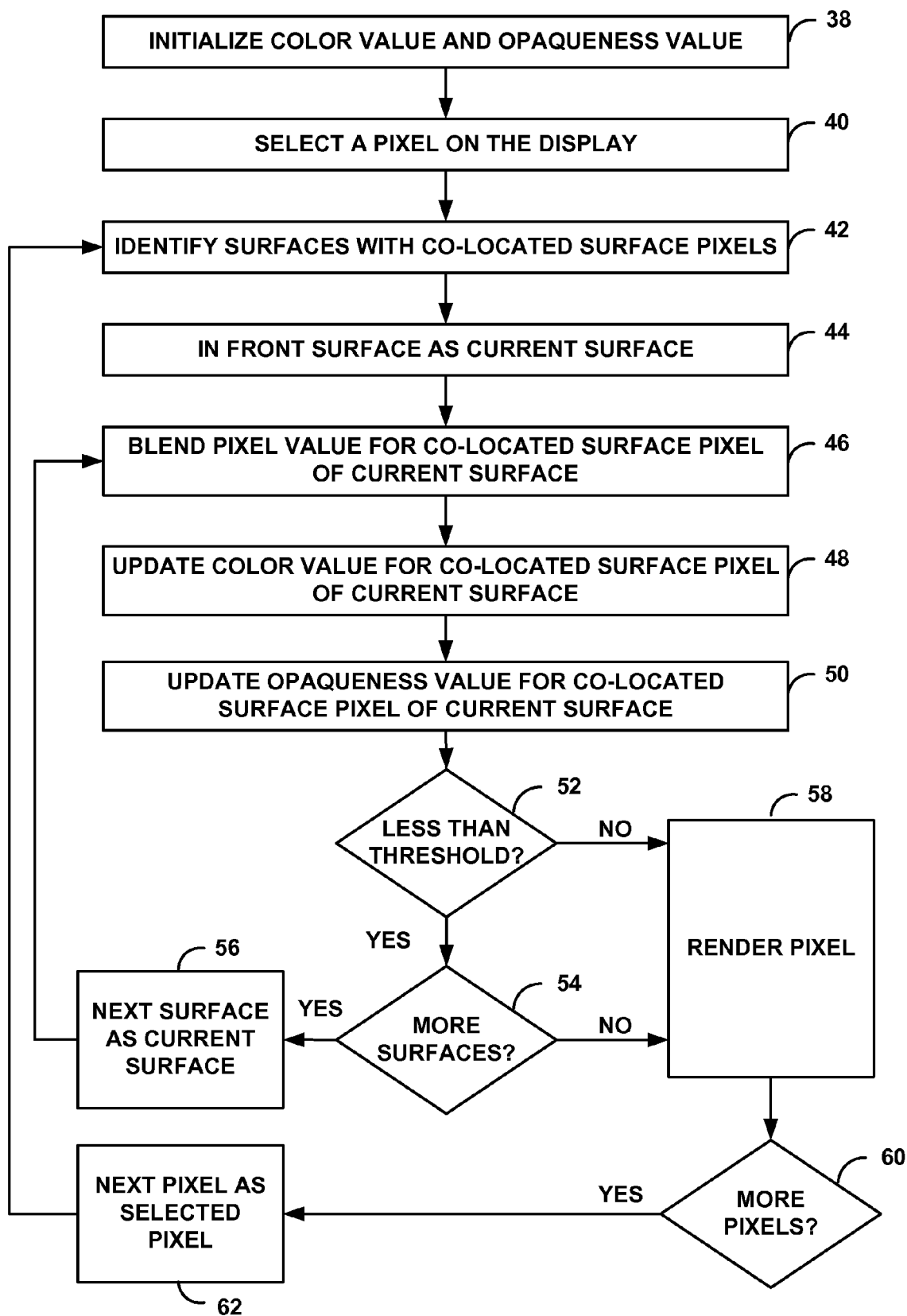
FIG. 4 is flow chart illustrating another example operation of the GPU in accordance with some aspects of this disclosure.

FIG. 4 is a flow chart illustrating another example operation of GPU 6 in accordance with aspects of this disclosure. For purposes of illustration, reference is made to FIG. 1. GPU 6 may be a processing unit. GPU 6 may initialize stored blended color values and accumulated opaqueness values to zero (38). GPU 6 may select a pixel on display 8 (40). In some examples, GPU 6 may select the pixel located at (0, 0) on display 8, although GPU 6 may select any other pixel on display 8.

GPU 6 may identify surfaces that include surface pixels that are co-located with the selected pixel on display 8 (42). In some examples, GPU 6 may identify surfaces based on at least the locations of the surfaces. Host processor 4 may determine the locations of the surfaces based on vertex coordinates of the vertices of the surfaces, as one example. Host processor 4 may transmit the locations of the surfaces to GPU 6 for internal storage or to storage device 12 for storage. GPU 6 may receive the locations of the surfaces from its own cache or from storage device 12.

Based on at least the identified surfaces, GPU 6 may identify the surface, that includes a co-located surface pixel, that is in front of all other surfaces that include co-located surface pixels as the current surface, e.g., the front-most surface of the identified surfaces (44). GPU 6 may identify the current surface based on at least an order identifier of the surfaces. Host processor 4 or the user may select the order of the surfaces. Host processor 4 may assign an order identifier to each surface. Host processor 4 may transmit the order identifiers to GPU 6 for internal storage or to storage device 12 for storage. GPU 6 may receive the order identifiers of the surfaces from its own cache or from storage device 12.

In some examples, host processor 4 may not assign an order identifier to each surface. In some of these examples, GPU 6 may determine the order of the surfaces based on the order in which host processor 4 stored information for the surfaces in storage device 12.

Shader 18 may blend a pixel value for the co-located surface pixel of the current surface with the stored blended color value (46). The pixel value may include a color value and an opaqueness value of the co-located surface pixel of the current surface. To blend the pixel value, shader 18 may implement the following equation:

$$New\_color\_value=(Src\_color)(Src\_alpha)+(1-Src\_alpha)(Dest\_color)$$

In the previous equation, Src_color equals the color value of the co-located surface pixel of the current surface. Src_color may also include the intensity of the co-located surface pixel. Src_alpha equals the opaqueness value of the co-located surface pixel of the current surface. Dest_color equals the stored blended color value. The color value and the opaqueness value of the co-located surface pixel of the current surface may be assigned by host processor 4.

Shader 18 may update the stored blended color value after blending the pixel values (48). To update the stored blended color, shader 18 may set the stored blended color value equal to the blended pixel value. For example, shader 18 may set Dest_color=New_color_value.

In some examples, shader 18 may also update the stored accumulated opaqueness value (50). Host processor 4 may assign each surface pixel an opaqueness value. Host processor 4 may also assign each surface an opaqueness value. Shader 18 may update the accumulated opaqueness value based on at least the stored accumulated opaqueness value and the opaqueness value of the co-located surface pixel and/or the opaqueness value of the current surface.

As described above, shader 18 may implement the following equations to update the stored opaqueness value.

$$New\_opaqueness\_value=Dest\_alpha+(1-Dest\_alpha)*(Src\_alpha*surface[i].surface\_alpha)Dest\_alpha=New\_opaqueness\_value$$

In the previous equations, Src_alpha equals the opaqueness value of at least one of the co-located surface pixel of the current surface and the opaqueness value of the current surface. Surface[i].surface_alpha equals the surface opaqueness value of "ith" surface. The variable "i" may indicate the order of the current surface that is being processed. Dest_alpha equals the stored accumulated opaqueness value.

Shader 18 may determine whether the accumulated opaqueness value is less than an opaqueness value threshold (52). The opaqueness value threshold may be 100% opacity, although other lower threshold values are possible. If the accumulated opaqueness value is substantially equal to or greater than the opaqueness value threshold (NO of 52), GPU 6 may render the selected pixel on display 8 (58). GPU 6 may render the selected pixel on display 8 based at least on the stored color value.

If the accumulated opaqueness value is less than the opaqueness value threshold (YES of 52), GPU 6 may determine whether there are more surfaces that include co-located surface pixels that are co-located with the selected pixel on display 8, e.g., more identified surfaces (54). If there are no more surfaces that include co-located surface pixels (NO of 54), GPU 6 may render the selected pixel on display 8 (58). If there are more surfaces that include co-located surface pixels (YES of 54), GPU 6 may select the next surface based on the received ordering of the surfaces.

The next surface may be a surface that includes a co-located surface pixel that is overlapped by the co-located surface pixel of the current surface. The co-located surface pixel of the next surface may be co-located with the selected pixel on display 8. GPU 6 may identify the next surface as the current surface (56). GPU 6 may repeat the blending pixel values act (46) and the updating color value and opaqueness value acts (48 and 50) until the opaqueness value is greater than the opaqueness value threshold, or there are no more surfaces that include co-located surface pixels.

After GPU 6 renders the pixel (58), GPU 6 may determine whether there are more pixels to be rendered on display 8 (60). If there are more pixels to be rendered on display 8 (YES of 60), GPU 6 may identify the next pixel on display 8 as the selected pixel (62). In some examples, GPU 6 may select the next pixel in raster fashion. GPU 6 may then identify surfaces with surface pixels that are co-located with the selected pixel (42). GPU 6 and shader 18 may repeat the acts described above until there are no more pixels to be rendered on display 8.

The following is pseudo-code for an example implementation of aspects of this disclosure. The pseudo-code may be stored on storage device 12 and implemented by GPU 6 and shader 18, or may be stored on memory internal to GPU 6.

```
10.     Dest_alpha = 0;
20.     Dest_color = 0;
30.     for (i=0; <= #of_source_surfaces; i++)
40.     {
50.         if ((Screen_X >= Surface[i].leftmost_x) && (Screen_X <=
60.     Surface[i].righmost_x) && (Screen_Y >=
        Surface[i].topmost_y) &&
70.     (Screen_Y <= Surface[i].bottommost))
80.         {
90.             Source = Texture_Fetch[Screen_X +
                    Surface[i].X_Offset,
100.            Screen_Y + Surface[i].Y_Offset,
                sampler[i],texture[i]];
110.            Dest_color += Source.color*(1-Dest_alpha) *
                    Source.alpha *
120.        Surface[i].Surface_Alpha;
130.            Dest_alpha += (1-Dest_alpha) * (Source.alpha *
140.        Surface[i].Surface_Alpha;
150.        }
160.        if (Dest_alpha >= 1.0)
170.            break;
180.    }
190.    Write_to_System_Memory (Dest_color).
```

In the example pseudo-code, at lines 10 and 20, shader 18 initializes the stored blended color value and accumulated opaqueness value to zero. At line 30, for each identified surface that includes a co-located surface pixel that is co-located with a pixel on display 8, shader 18 implements the instructions of lines 50 through 180.

At lines 50 through 70, shader 18 ensures that a co-located surface pixel is located within the current surface. At lines 90 and 100, shader 18 retrieves the pixel values of the co-located pixel from storage device 12 or the memory internal to GPU 6. At lines 110 and 120, shader 18 blends the color value of the co-located surface pixel with the stored blended color value, and updates the blended color value. At lines 130 and 140, shader 18 updates the accumulated opaqueness value with the opaqueness value of co-located surface pixel.

At lines 160 and 170, shader 18 determines whether the accumulated opaqueness value is greater than or equal to the opaqueness value threshold. In the example pseudo-code, the opaqueness value threshold is 100% opacity. If the accumulated opaqueness value is greater than or equal to the opaqueness value threshold, shader 18 terminates the accumulation and blend of co-located surface pixels. At line 190, GPU 6 writes the blended color value to a buffer, e.g., buffer 10 for future presentment.

In one or more examples, the functions described may be implemented in hardware, software, firmware, or any combination thereof. If implemented in software, the functions may be stored as one or more instructions or code on an article of manufacture comprising a non-transitory computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more DSPs, general purpose microprocessors, ASICs, FPGAs, or other equivalent integrated or discrete logic circuitry. Accordingly, the term "processor unit," as used herein may refer to any of the foregoing structure or any other structure suitable for implementation of the techniques described herein. The term "processing unit," as used herein may refer to host processor 4, GPU 6, shader 18, or any combination thereof. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
receiving, with a processing unit, locations of each one of a plurality of surfaces to be displayed on a display;
identifying, with the processing unit, all surfaces of the plurality of surfaces that include one or more co-located surface pixels that are co-located with at least one pixel of the display based on at least the location of each one of the surfaces;
after identifying all surfaces of the plurality of surfaces, blending, with the processing unit, pixel values of the one or more co-located surface pixels, of the identified surfaces, that are co-located with the at least one pixel based on at least an order of the identified surfaces of the plurality of surfaces;
accumulating at least one of opaqueness values of the one or more co-located surface pixels and opaqueness values of the identified surfaces, based on the order of the identified surfaces until, an accumulated opaqueness value is substantially equal to or greater than an opaqueness value threshold; and
terminating the accumulation and blending when the accumulated opaqueness value is equal to or greater than the opaqueness value threshold.

2. The method of claim 1, wherein the opaqueness value threshold comprises a value corresponding to complete opacity.

3. The method of claim 1, wherein accumulating opaqueness values comprises accumulating opaqueness values, starting from a front-most surface of the identified surfaces and continuing toward a back-most surface of the identified surfaces, wherein the front-most and back-most surfaces are determined based on the order of the identified surfaces of the plurality of surfaces.

4. The method of claim 1, further comprising:
retrieving the opaqueness values in a batch,
wherein accumulating opaqueness values comprises accumulating the opaqueness values retrieved in the batch.

5. The method of claim 1, further comprising:
receiving an order of each surface of the plurality of surfaces,
wherein the order of the identified surfaces of the plurality of surfaces is based on the received order.

6. The method of claim 1, further comprising:
rendering the at least one pixel based on the blending.

7. The method of claim 1, wherein the location of each one of the plurality of surfaces comprises coordinates of at least two vertices of each one of the plurality of surfaces.

8. The method of claim 1, wherein viewable objects generated by one or more applications executed on a device that includes the processing unit form each one of the plurality of surfaces.

9. The method of claim 1, wherein at least one of the plurality of surfaces partially or fully overlaps another one of the plurality of surfaces.

10. The method of claim 1, wherein the pixel values comprise color values and opaqueness values.

11. The method of claim 1, wherein blending pixel values of the one or more surface pixels comprises blending, only once, the one or more co-located surface pixels.

12. The method of claim 1, wherein blending pixel values of the one or more surface pixels comprises blending pixel values starting from a back-most surface and continuing to a front-most surface.

13. An apparatus comprising:
a graphics processing unit (GPU) configured to receive a location of each one of a plurality of surfaces to be displayed on a display;
a shader configured to:
identify all surfaces of the plurality of surfaces that include one or more co-located surface pixels that are co-located with at least one pixel of the display based on the location of each one of the surfaces;
after identifying all surfaces of the plurality of surfaces, blend pixel values of the one or more co-located surface pixels, of the identified surfaces, that are co-located with the at least one pixel based on at least an order of the identified surfaces of the plurality of surfaces;
accumulate at least one of opaqueness values of the one or more co-located surface pixels and opaqueness values of the identified surfaces, based on the order of the identified surfaces, until an accumulated opaqueness value is substantially equal to or greater than an opaqueness value threshold; and
terminate the accumulation and blend when the accumulated opaqueness value is equal to or greater than the opaqueness value threshold; and
a memory configured to store the blended pixel values.

14. The apparatus of claim 13, wherein the GPU includes the shader.

15. The apparatus of claim 13, further comprising:
a host processor configured to identify the location of each one of the plurality of surfaces to be displayed on the display, assign the pixel values for the one or more surface pixels, and determine the order of the plurality of surfaces.

16. The apparatus of claim 13, wherein the opaqueness value threshold comprises a value corresponding to complete opacity.

17. The apparatus of claim 13, wherein the shader is further configured to accumulate opaqueness values, starting from a front-most surface of the identified surfaces and continuing toward a back-most surface of the identified surfaces, wherein the front-most and back-most surfaces are determined based on the order of the identified surfaces of the plurality of surfaces.

18. The apparatus of claim 13, wherein the shader is further configured to:
retrieve opaqueness values in a batch; and
accumulate the opaqueness values retrieved in the batch.

19. The apparatus of claim 13, wherein the GPU is further configured to:
receive an order of each surface of the plurality of surfaces,
wherein the order of the identified surfaces of the plurality of surfaces is based on the received order.

20. The apparatus of claim 13, wherein the GPU is further configured to render the at least one pixel based on the blend.

21. The apparatus of claim 13, wherein the location of each one of the plurality of surfaces comprises coordinates of at least two vertices of each one of the plurality of surfaces.

22. The apparatus of claim 13, wherein viewable objects generated by one or more applications executed on the apparatus form each one of the plurality of surfaces.

23. The apparatus of claim 13, wherein at least one of the plurality of surfaces partially or fully overlaps another one of the plurality of surfaces.

24. The apparatus of claim 13, wherein the pixel values comprise color values and opaqueness values.

25. The apparatus of claim 13, wherein the shader is configured to blend, only once, the one or more co-located surface pixels.

26. The apparatus of claim 13, wherein the shader is configured to blend starting from a back-most surface and continuing to a front-most surface.

27. A non-transitory computer-readable storage medium comprising instructions that cause one or more processors to:
receive locations of each one of a plurality of surfaces to be displayed on a display;
identify all surfaces of the plurality of surfaces that include one or more co-located surface pixels that are co-located with at least one pixel of the display based on at least the location of each one of the surfaces;
after identifying all surfaces of the plurality of surfaces, blend pixel values of the one or more co-located surface pixels, of the identified surfaces, that are co-located with the at least one pixel based on at least an order of the identified surfaces of the plurality of surfaces;
accumulate at least one of opaqueness values of the one or more co-located surface pixels and opaqueness values of the identified surfaces, based on the order of the identified surfaces, until an accumulated opaqueness value is substantially equal to or greater than an opaqueness value threshold; and
terminate the accumulation and blend when the accumulated opaqueness value is equal to or greater than the opaqueness value threshold.

28. The non-transitory computer-readable storage medium of claim 27, wherein the opaqueness value threshold comprises a value corresponding to complete opacity.

29. The non-transitory computer-readable storage medium of claim 27, wherein the instructions that cause the one or more processors to accumulate opaqueness values comprise instructions that cause the one or more processors to accumulate opaqueness values, starting from a front-most surface of the identified surfaces and continuing toward a back-most surface of the identified surfaces, wherein the front-most and back-most surfaces are determined based on the order of the identified surfaces of the plurality of surfaces.

30. The non-transitory computer-readable storage medium of claim 27, further comprising instructions that cause the one or more processors to:
retrieve the opaqueness values in a batch
wherein the instructions that cause the one or more processors to accumulate opaqueness values comprise instructions that cause the one or more processors to accumulate the opaqueness values retrieved in the batch.

31. The non-transitory computer-readable storage medium of claim 27, further comprising instructions that cause the one or more processors to:
receive an order of each surface of the plurality of surfaces, wherein the order of the identified surfaces of the plurality of surfaces is based on the received order.

32. The non-transitory computer-readable storage medium of claim 27, further comprising instructions that cause the one or more processors to:
render the at least one pixel based on the blend.

33. The non-transitory computer-readable storage medium of claim 27, wherein the location of each one of the plurality of surfaces comprises coordinates of at least two vertices of each one of the plurality of surfaces.

34. The non-transitory computer-readable storage medium of claim 27, wherein the pixel values comprise color values and opaqueness values.

35. The non-transitory computer-readable storage medium of claim 27, wherein the instructions that cause the one or more processors to blend pixel values of the one or more surface pixels comprise instructions that cause the one or more processors to blend, only once, the one or more co-located surface pixels.

36. An apparatus comprising:
means for receiving locations of each one of a plurality of surfaces to be displayed on a display;
means for identifying all surfaces of the plurality of surfaces that include one or more co-located surface pixels that are co-located with at least one pixel of the display based on at least the location of each one of the surfaces;
means for, after identifying all surfaces of the plurality of surfaces, blending pixel values of the one or more co-located surface pixels, of the identified surfaces, that are co-located with the at least one pixel based on at least an order of the identified surfaces of the plurality of surfaces;
means for accumulating at least one of opaqueness values of the one or more co-located surface pixels and opaqueness values of the identified surfaces, based on the order of the identified surfaces, until an accumulated opaqueness value is substantially equal to or greater than an opaqueness value threshold; and
means for terminating the accumulation and blending when the accumulated opaqueness value is equal to or greater than the opaqueness value threshold.

37. The method of claim 1, wherein blending the pixel values of the one or more co-located surface pixels comprises concurrently blending, with the processing unit, all pixel values of the one or more co-located surface pixels.

38. The apparatus of claim 13, wherein the shader blends the pixel values of the one or more co-located surface pixels at least in part by concurrently blending all pixel values of the one or more co-located surface pixels.

39. The non-transitory computer-readable storage medium of claim 27, wherein the instructions that cause the one or more processors to blend the pixels values of the one or more co-located surface pixels comprise instructions that cause the one or more processors to:
concurrently blend all pixels values of the one or more co-located surface pixels.

40. The apparatus of claim 36, wherein the means for blending the pixel values of the one or more co-located surface pixels comprises means for concurrently blending all pixel values of the one or more co-located surface pixels.

* * * * *